United States Patent [19]

Breyer et al.

[11] Patent Number: 4,825,091
[45] Date of Patent: Apr. 25, 1989

[54] OPTOELECTRONIC DISTANCE SENSOR WITH VISIBLE PILOT BEAM

[75] Inventors: Karl-Hermann Breyer, Heidenheim; Klaus P. Koch, Aalen, both of Fed. Rep. of Germany

[73] Assignee: Carl-Zeiss-Stiftung, Heidenheim, Fed. Rep. of Germany

[21] Appl. No.: 151,207

[22] Filed: Feb. 1, 1988

[30] Foreign Application Priority Data

Feb. 5, 1987 [DE] Fed. Rep. of Germany ....... 3703422

[51] Int. Cl.$^4$ ............................................. G01N 21/86
[52] U.S. Cl. ........................................ 250/560; 356/1
[58] Field of Search ................ 250/560, 561, 201 AF; 356/1, 4, 376, 381

[56] References Cited

U.S. PATENT DOCUMENTS

| | | | |
|---|---|---|---|
| 3,610,127 | 2/1970 | Ruhle | 356/4 |
| 4,325,639 | 4/1982 | Richter | 356/1 |
| 4,479,717 | 10/1984 | Cornillault | 250/227 |
| 4,595,829 | 6/1986 | Neümann et al. | 250/201 AF |
| 4,630,927 | 12/1986 | Fulkerson | 356/372 |
| 4,647,209 | 3/1987 | Neukomm et al. | 356/1 |

FOREIGN PATENT DOCUMENTS 0163347 5/1985 Fed. Rep. of Germany .

*Primary Examiner*—David C. Nelms
*Assistant Examiner*—Eric F. Chatmon
*Attorney, Agent, or Firm*—Walter Ottesen

[57] ABSTRACT

The invention is directed to a distance sensor operating in accordance with the triangulation principle. The distance sensor has at least one pilot beam source which makes the imaging beam path of the sensor visible. The imaging beam path is inclined with respect to the measuring beam. A second pilot beam source is provided for the situation wherein the actual measuring beam of the sensor is not in the visible spectral region. A visible pilot beam is then superposed on the measuring beam.

8 Claims, 2 Drawing Sheets

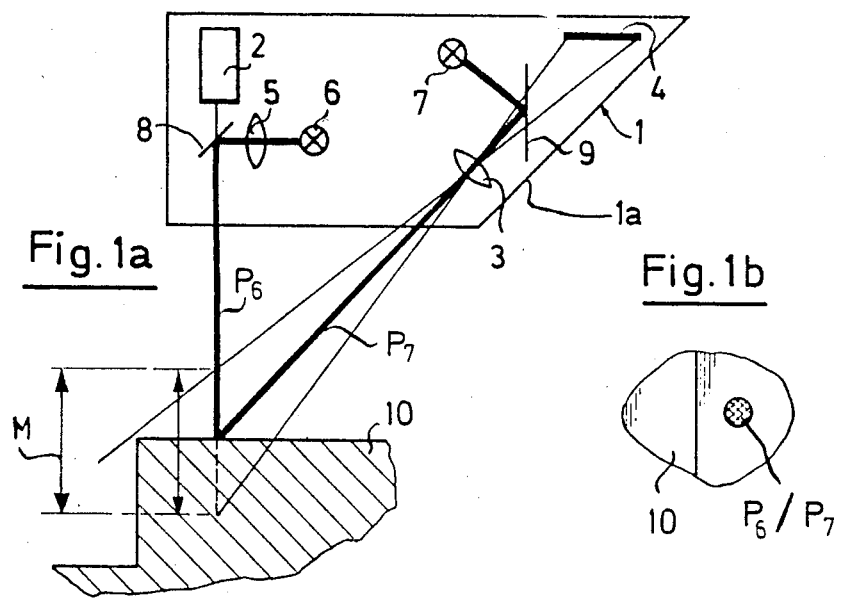
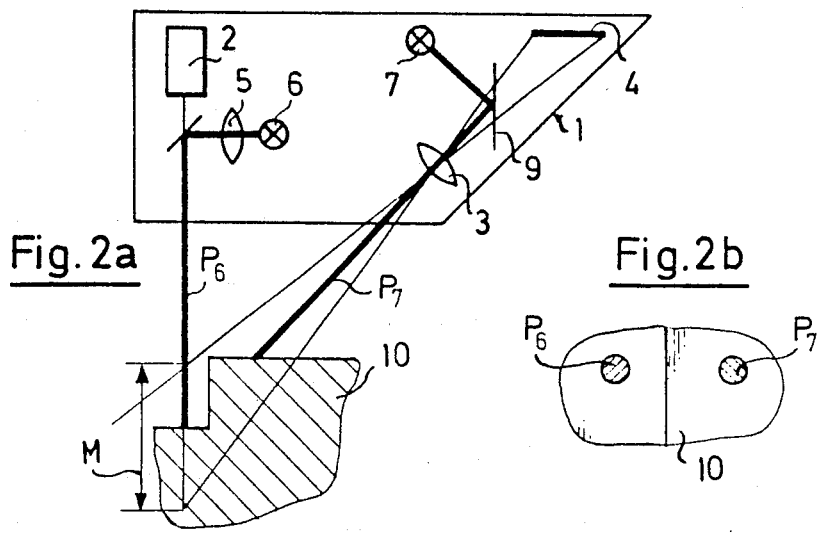

OPTOELECTRONIC DISTANCE SENSOR WITH VISIBLE PILOT BEAM

FIELD OF THE INVENTION

The invention relates to a distance sensor operating in accordance with the triangulation principle. The distance sensor has a light source for the measuring beam and a position-sensitive photoelectric receiver arranged in the imaging beam path inclined to the measuring beam.

BACKGROUND OF THE INVENTION

Distance sensors are also known as optical sensing heads or contactless sensors and are disclosed, for example, in European Patent Application Publication Nos. 0 156 991 and 0 163 347. These distance sensors are utilized, for example, in coordinate measuring technology for measuring or scanning workpieces.

Most of the known distance sensors include an infrared laser diode for generating the measuring-light beam to generate a spot having the smallest possible dimensions on the workpiece to be measured. This measuring spot is then imaged on the detector via the imaging beam path aligned at an angle to the measuring beam path. The distance to the measuring object is determined by electronic means from the position of the measuring spot on the detector.

The process of setting up the distance sensor above the workpiece surface is also known as "teach in". When setting up the distance sensor in advance of an actual measuring operation, the operating person has a series of tasks to perform with respect to the coordinate measuring apparatus which include the following:

(a) The sensor must be brought to a predetermined distance to the test object on which work is to be performed so that the surface of the test object is approximately in the center of the measuring region of the sensor.

(b) The measuring spot generated by the sensor is positioned at the location on the test object provided for beginning the measurement.

(c) In addition, it must be made certain that no obstructions shade the imaging beam path of the sensor.

Distance sensors which have a light source emitting a non-visible spectral range for generating the measuring spot such as an infrared laser diode present problems in this regard. This is so because additional assisting means such as a so-called infrared viewer is necessary in order to make the measuring spot visible to the operating person so that the above-mentioned work can be carried out. However, even when the measuring spot projected from the sensor is visible, difficulties nonetheless remain with respect to carrying out the above-mentioned points (a) and (c), since it cannot be recognized for certain when and to what extent the imaging beam path is shaded in the upper surface of the workpiece or test object. Such shading can be produced by edges or other non-uniformities.

SUMMARY OF THE INVENTION

It is an object of the invention to provide a distance sensor of the kind described above wherein the set-up operation for the operating person is facilitated.

According to a feature of the distance sensor according to the invention, the imaging beam path is superposed with its own pilot beam in the visible spectral range.

With this solution, shading of the imaging beam path is recognized with certainty and prevented which is beneficial to the set-up operation. Furthermore, it is possible in a simple manner to correctly adjust the distance between the sensor and the test object if the measuring beam itself is visible or also if the measuring light beam is superposed with its own visible pilot beam. In this connection, reference may be made to point (a) described above.

A single pilot beam can be superposed on the imaging beam path and can, for example, make the center of the measuring region of the sensor recognizable or, several pilot beams, for example two, can make the edges of the measuring region visible. Furthermore, the pilot beam can be in the form of a ray fan which covers the entire measuring region. Such a ray fan can be generated by expanding the beam with the aid of a cylinder lens.

The two last mentioned possibilities are especially suitable when arranging the sensor for the scanning operation in which the sensor is not adjusted to a precisely predetermined distance; instead, where it is only required that the test object is located with certainty within the measuring region of the sensor.

For generating the pilot beams, all conventional light sources such as incandescent lamps with or without color filters, light-emitting diodes or laser light sources with corresponding projection optics can be utilized. When working with several pilot beams, it is advantageous in this connection to step the colors of these beams.

BRIEF DESCRIPTION OF THE DRAWINGS

The invention will now be described with reference to the drawings wherein:

FIG. 1a is a schematic, partially in section, of one embodiment of the distance sensor according to the invention shown in a first position above the test object to be measured;

FIG. 1b shows the visible point of incidence of the pilot beams of FIG. 1a on the test object;

FIG. 2a shows the sensor of FIG. 1a in a second position above the test object;

FIG. 2b shows the point of incidence of the pilot beams corresponding to this second position of the distance sensor;

DESCRIPTION OF THE PREFERRED EMBODIMENTS OF THE INVENTION

Figure 3:
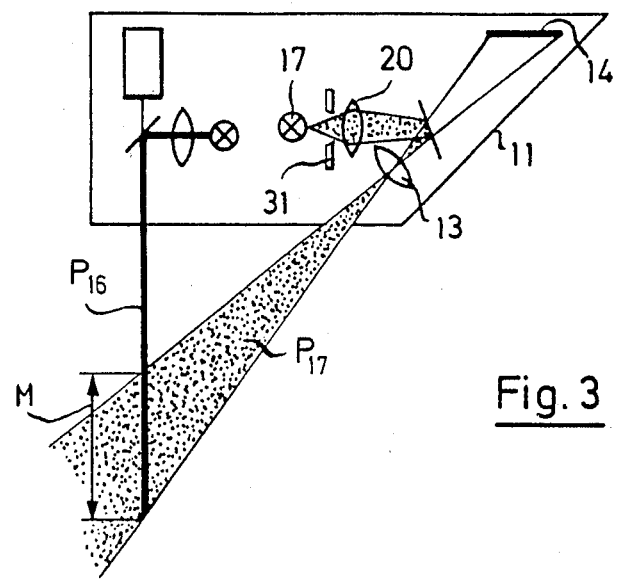
FIG. 3 is a schematic of a second embodiment of the distance sensor according to the invention; and, FIG. 4 is a schematic of a third embodiment of the distance sensor according to the invention.

The distance sensor shown in FIG. 1a comprises an infrared laser diode 2 equipped with optical collimating means from which the measuring beam emanates. The laser beam generates a measuring spot of the smallest possible dimensions when impinging upon the workpiece 10 to be measured. The diameter of this measuring spot typically amounts to a few hundred micrometers.

In addition, the distance sensor comprises an objective 3 which images the measuring region M on a position-sensitive photoelectric detector 4 while maintaining the Scheimpflug condition. The photoelectric detector 4 can, for example, be a diode array or a so-called CCD-array. The measuring beam $P_6$ and the imaging beam path $P_7$ are inclined with respect to each other (triangulation).

The above-mentioned optical components as well as the electronics (not shown) which are needed to perform operations such as driving the detector 4 and processing the signals coming therefrom are mounted in the common housing 1a. The housing 1a can, for example, be attached to the spindle of a coordinate measuring apparatus.

According to a feature of the invention, the distance sensor 1 includes two further light sources 6 and 7. These light sources can be light-emitting diodes which emit light in the visible spectral range such as red and green. The beam $P_6$ of the light-emitting diode 6 is focussed via a collector 5 and is coaxially superposed on the measuring beam with the aid of a first dichroic beam splitter 8 and the light $P_7$ emanating from the light-emitting diode 7 is superposed on the imaging beam path with the aid of a second dichroic beam splitter 9. In this arrangement, the light diode 7 is mounted so that in combination with the already provided objective 3, an imaging of the light-emitting diode 7 in the center of the measuring region M results.

The pilot beams $P_6$ and $P_7$ generated in this manner serve as an adjusting aid to bring the sensor 1 into the position (distance and location) relative to the workpiece 10 to be measured which is desired at the beginning of the measurement. As shown in FIG. 1a, this condition is provided when the surface of the workpiece 10 lies in the center of the measuring region M. The two pilot beams $P_6$ and $P_7$ join then at a single point and, a single light spot having a diameter of several mm can be seen in a mixed color as shown in FIG. 1b.

On the other hand, if the adjusting operation is not precisely carried out because, for example, an edge of the workpiece 10 shades the measuring spot as shown in FIG. 2a and the detector 4 therefore delivers no signal, then this condition is indicated to the operating person by the separated impinging points of the respective pilot beams $P_6$ and $P_7$ as shown in FIG. 2b. The operating person can then perform the needed operations to correctly position the sensor 1 with respect to the surface of the workpiece 10.

FIG. 3 shows a second and slightly modified embodiment of the invention which differs from the embodiment shown in FIGS. 1a and 2a only in that the pilot beam source 17 corresponding to the imaging beam path is provided with a cylinder lens 20 inserted ahead thereof as shown. This cylinder lens 20 in combination with the objective 13 images the light source in the shape of a line on the projection axis.

In this way, a ray fan is produced which is limited by a diaphragm 31 so that the ray fan fills out the entire measuring region M as shown. With a correct adjustment of the sensor 11, the impinging point of the pilot beam $P_{16}$ superposed on the measuring beam lies in the region of the intersection line of the pilot ray fan $P_{17}$ with the surface of the workpiece.

The remaining components of the sensor 11 are identical with the sensor 1 shown in FIG. 1a so that their description at this point is unnecessary.

Figure 4:
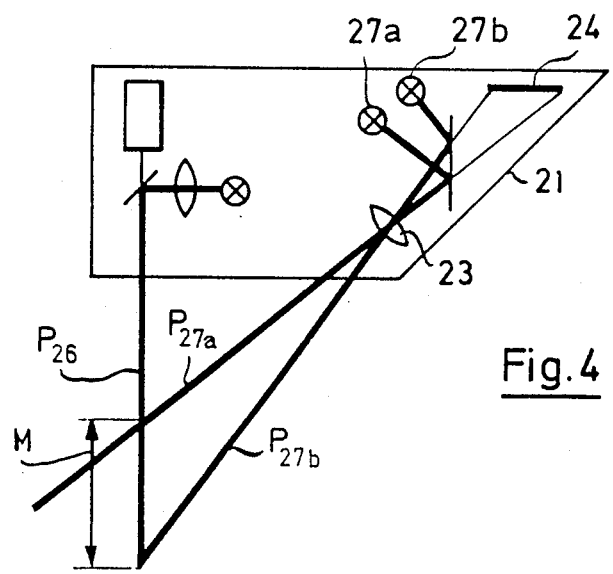

A further embodiment of the invention is shown in FIG. 4 wherein the distance sensor 21 includes two pilot beam sources 27a and 27b for the imaging beam path. These pilot beam sources 27a and 27b are arranged next to each other so that the respective axes of the pilot beams $P_{27a}$ and $P_{27b}$ emanating therefrom extend along the edges of the angular coverage region of the objective 23 and thereby intersect the pilot beam $P_{26}$ in the measuring beam path at the upper and lower ends of the measuring region M. The remaining components of this embodiment correspond identically to the remaining components of the distance sensor shown in FIGS. 1a and 1b.

It is understood that the foregoing description is that of the preferred embodiments of the invention and that various changes and modifications may be made thereto without departing from the spirit and scope of the invention as defined in the appended claims.

What is claimed is:

1. An optoelectronic distance sensor for operating on a workpiece in accordance with the triangulation principle, the distance sensor comprising:
   light source means for generating a measuring beam and directing the same onto a workpiece to define a measuring region;
   a position-sensitive photoelectric receiver;
   optical imaging means for imaging said measuring region on said receiver and for defining an imaging beam path inclined to said measuring beam and extending from said measuring region to said receiver; and,
   pilot beam means for superposing a pilot beam in the visible spectral range onto said imaging beam path.

2. The optoelectronic distance sensor of claim 1, said pilot beam means including means for superposing a single pilot beam for marking the central part of said measuring region.

3. The optoelectronic distance sensor of claim 1, said pilot beam means including: pilot beam light source means; and, beam divider means for imaging said pilot beam light source means into the center of said measuring range via said optical imaging means.

4. The optoelectronic distance sensor of claim 1, wherein said measuring region extends between first and second ends, said pilot beam means including: first pilot means for superposing a first pilot beam on said imaging beam path so as to cause said first pilot beam to mark said first end of said measuring region; and, second pilot beam means for superposing a second pilot beam on said imaging beam path so as to cause said second pilot beam to mark said second end of said measuring region.

5. The optoelectronic distance sensor of claim 1, said pilot beam means including means for forming and superposing a ray fan on said imaging beam path so as to overlap all of said measuring region.

6. The optoelectronic distance sensor of claim 1, said pilot beam means including pilot beam light source means; a cylinder lens for receiving the light of said pilot beam light source means to form a pilot beam; beam divider means disposed in said imaging beam path for directing said pilot beam into said optical imaging means for coacting with said cylinder lens to cause said pilot beam to overlap all of said measuring region.

7. An optoelectronic distance sensor for operating on a workpiece in accordance with the triangulation principle, the distance sensor comprising:
   light source means for generating a measuring beam in the non-visible spectral range and for directing said measuring beam onto a workpiece to define a measuring region;
   a position-sensitive photoelectric receiver;
   optical imaging means for imaging said measuring region on said receiver and for defining an imaging beam path inclined to said measuring beam and extending from said measuring region to said receiver;

first pilot beam means for superposing a first pilot beam in the visible spectral range onto said imaging beam path; and, second pilot beam means for superposing a second pilot beam in the visible spectral range onto said measuring beam.

8. The optoelectronic distance sensor of claim 7, said first pilot beam means including means for generating said first pilot beam in a first color and said second pilot beam means including means for generating said second pilot beam in a second color different from said first color.

* * * * *